United States Patent
Huai

(10) Patent No.: US 8,296,366 B2
(45) Date of Patent: Oct. 23, 2012

(54) EFFICIENT ROUTING OF REAL-TIME MULTIMEDIA INFORMATION

(75) Inventor: Qianbo Huai, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1759 days.

(21) Appl. No.: 10/856,262

(22) Filed: May 27, 2004

(65) Prior Publication Data

US 2005/0278763 A1    Dec. 15, 2005

(51) Int. Cl.
G06F 15/16 (2006.01)
(52) U.S. Cl. ........................................... 709/205
(58) Field of Classification Search ............... 709/205
See application file for complete search history.

(56) References Cited

U.S. PATENT DOCUMENTS

| | | | |
|---|---|---|---|
| 5,003,532 A * | 3/1991 | Ashida et al. | 348/14.09 |
| 5,206,721 A * | 4/1993 | Ashida et al. | 348/14.1 |
| 5,684,527 A * | 11/1997 | Terui et al. | 348/14.09 |
| 5,760,767 A | 6/1998 | Shore et al. | |
| 5,781,188 A | 7/1998 | Amiot et al. | |
| 5,867,653 A | 2/1999 | Aras et al. | |
| 5,930,446 A | 7/1999 | Kanda | |
| 5,930,704 A * | 7/1999 | Kay | 455/419 |
| 5,930,797 A | 7/1999 | Hill | |
| 5,999,173 A | 12/1999 | Ubillos | |
| 5,999,966 A | 12/1999 | McDougall et al. | |
| 6,038,425 A | 3/2000 | Jeffrey | |
| 6,237,025 B1 | 5/2001 | Ludwig et al. | |
| 6,281,900 B1 | 8/2001 | Ishikawa | |
| 6,343,313 B1 | 1/2002 | Salesky et al. | |
| 6,400,378 B1 | 6/2002 | Snook | |
| 6,501,739 B1 * | 12/2002 | Cohen | 370/260 |
| 6,519,540 B1 | 2/2003 | Salandro | |
| 6,571,255 B1 | 5/2003 | Gonsalves et al. | |
| 6,594,773 B1 | 7/2003 | Lisitsa et al. | |
| 6,600,725 B1 | 7/2003 | Roy | |
| 6,606,112 B1 | 8/2003 | Falco | |
| 6,650,745 B1 | 11/2003 | Bauer et al. | |
| 6,657,975 B1 | 12/2003 | Baxley et al. | |

(Continued)

FOREIGN PATENT DOCUMENTS

JP    Hei 06054322    2/1994

(Continued)

OTHER PUBLICATIONS

Postel, J., RFC 768: User Datagram Protocol, Aug. 1980, IETF, pp. 1-3.*

(Continued)

*Primary Examiner* — Alicia Baturay
(74) *Attorney, Agent, or Firm* — Perkins Coie LLP

(57) ABSTRACT

A system for efficient routing of real-time multimedia information is provided. The system efficiently routes messages containing real-time multimedia information by configuring and using multi-control unit connectors ("connectors"), which are special-purpose components optimized to route messages. A computing device may use multiple connectors to dynamically create connections with resources of the computing device or other computing devices simultaneously. An application can dynamically configure a connector to operate as client, server, or client-servers. The connector may also have a mode in which it operates, such as mixer, reflector, or selector. These modes may define how a connector is to process received messages before forwarding them. By using the various modes and roles, the system can be used to combine and efficiently route multimedia information for meaningful presentation to users of disparate computing devices.

32 Claims, 8 Drawing Sheets

U.S. PATENT DOCUMENTS

| | | | |
|---|---|---|---|
| 6,657,983 B1* | 12/2003 | Surazski et al. | 370/337 |
| 6,675,386 B1 | 1/2004 | Hendricks et al. | |
| 6,714,216 B2 | 3/2004 | Abe | |
| 6,847,618 B2 | 1/2005 | Laursen et al. | |
| 6,879,565 B2 | 4/2005 | Baxley et al. | |
| 6,891,798 B1* | 5/2005 | Yip et al. | 370/230 |
| 7,007,098 B1* | 2/2006 | Smyth et al. | 709/233 |
| 7,257,641 B1 | 8/2007 | VanBuskirk et al. | |
| 7,310,355 B1* | 12/2007 | Krein et al. | 370/492 |
| 7,404,001 B2* | 7/2008 | Campbell et al. | 709/231 |
| 7,533,403 B1* | 5/2009 | Krein et al. | 725/74 |
| 7,554,998 B2* | 6/2009 | Simonsson et al. | 370/406 |
| 7,558,221 B2* | 7/2009 | Nelson et al. | 370/260 |
| 2001/0042131 A1 | 11/2001 | Mathon et al. | |
| 2002/0176367 A1* | 11/2002 | Gross | 370/252 |
| 2003/0112947 A1* | 6/2003 | Cohen | 379/202.01 |
| 2004/0008635 A1 | 1/2004 | Nelson et al. | |
| 2004/0117507 A1* | 6/2004 | Torma | 709/248 |
| 2004/0217946 A1* | 11/2004 | Hamano | 345/173 |
| 2005/0062843 A1* | 3/2005 | Bowers et al. | 348/14.08 |
| 2005/0213725 A1* | 9/2005 | Rodman | 379/202.01 |
| 2005/0213726 A1* | 9/2005 | Rodman | 379/202.01 |
| 2005/0213727 A1* | 9/2005 | Nir et al. | 379/202.01 |
| 2005/0213732 A1* | 9/2005 | Rodman | 379/202.01 |
| 2005/0213733 A1* | 9/2005 | Rodman et al. | 379/202.01 |
| 2005/0213734 A1* | 9/2005 | Rodman | 379/202.01 |
| 2005/0213735 A1* | 9/2005 | Rodman et al. | 379/202.01 |
| 2005/0213736 A1* | 9/2005 | Rodman et al. | 379/202.01 |
| 2005/0213737 A1* | 9/2005 | Rodman et al. | 379/202.01 |
| 2005/0213738 A1* | 9/2005 | Rodman et al. | 379/202.01 |
| 2005/0213739 A1* | 9/2005 | Rodman et al. | 379/202.01 |
| 2005/0278763 A1 | 12/2005 | Huai | |

FOREIGN PATENT DOCUMENTS

| | | |
|---|---|---|
| KR | 10-0138862 | 5/1998 |

OTHER PUBLICATIONS

U.S. Appl. No. 09/539,026, filed Mar. 3, 2000, Buskirk et al.

Johanson, Mathias, "Video Communication Over the Internet," Thesis for the Degree of Licentiate of Philosophy, Chalmers University of Technology, Sweden, 2002, 112 pages.

H.243 Procedures for establishing communication between three or more audiovisual terminals using digital channels up to 1920 kbit/s under Series H: audiovisual and multimedia systems, infrastructure of audiovisual services-communication procedures by the International Telecommunication Union (Jul. 1997).

Asim Karim, H.323 and Associated Protocols Abstract, Nov. 26, 1999.

H.231 Multipoint control units for audiovisual systems using digital channels up to 1920 kbit/s under Series H: Audiovisual and Multimedia Systems, Infrastructure of audiovisual services—systems aspects by the International Telecommunication Union.

A Sample TAPI 3.0 Application Abstract from Microsoft Windows 2000 discussing a sample application called *Incoming*, that demonstrates the major features of TAPI 3.0.

TAPI 3.0 Connection and Media Services Abstract from Microsoft Windows 2000 reviewing SPs as they exist in TAPI 2.x, and discussing the enhancements provided in TAPI 3.0.

IP Telephony with TAPI 3.0 Abstract from Microsoft Windows 2000. TalkThroughHost1, Compressed Audio Conferencing Software and TalkThrough1, PCM and Compressed Audio Conferencing System product descriptions from Mibridge website.

* cited by examiner

EFFICIENT ROUTING OF REAL-TIME MULTIMEDIA INFORMATION

TECHNICAL FIELD

The described technology relates generally to data communications networks, and more particularly, to providing and using a unified architecture for efficient routing of real-time multimedia information in data communications networks.

BACKGROUND

Computing devices are increasingly being used to enable real-time communications. As an example, users may use computing devices to participate in conversations with one or more other users. Participating in a conversation may involve sending or receiving electronic information, such as audio, video, or both. Participants in such conversations may also send or receive other media forms, such as documents, presentation slides, or any other form of electronic information. This multimedia electronic information, and particularly the audio and video information, may be sent using a protocol such as a Real-time Transport Protocol ("RTP"). RTP is an Internet proposed standard protocol whose specification, "RFC 3550," is available as rfc/rfc3550.txt at the Internet Engineering Taskforce (IETF) web site. A specification for an Internet proposed standard relating to multi-participant conferences, "RFC 3551," is available as rfc/rfc3551.txt at IETF's web site. These specifications are incorporated herein in their entirety by reference. RTP may be used with other protocols, such as a Session Initiation Protocol ("SIP") and a Real-Time Streaming Protocol ("RTSP"). SIP may be used to provide signaling and other functions necessary for managing sessions between computing devices. RTP and RTSP may be used to carry information, such as audio and video information.

Audio and video information can be sent from a computing device to other computing devices using these (and other) protocols in a variety of network communications models, including unicast, multicast, broadcast and flooding communications models.

The unicast communications model, which is also known as point-to-point communications, may be used to send messages from a computing device to another computing device. In the unicast communications model, there may be a one-to-one association between a sender and a recipient. In a traditional unicast communications model, multiple participants may be unable to participate in a conversation simultaneously because, by definition, only two computing devices are exchanging messages. However, it may be possible to link the computing devices so that one of two connected computing devices in a unicast communications model forwards messages to a third computing device, thereby establishing two separate unicast connections. In such a case, two participants in a conversation talking simultaneously may be heard by a third participant as talking at different times because the third participant's computing device would receive audio information from the two other participants' computing devices separately. As an example, suppose A is participating in a conversation with B, and so A's computing device and B's computing device are connected. A second connection may be added between B's computing device and C's computing device so that C may also participate in the conversation. In the unicast communications model, C may hear B's voice followed by A's voice when A and B speak simultaneously. This could occur because messages containing audio information from A are sent to B's computing device, which forwards the messages to C's computing device without processing the messages. However, computing resources may limit the number of other computing devices to which a computing device may be connected simultaneously. Furthermore, if computing devices are connected to form a long chain, network delays may make information traveling from one end of the chain to the other untimely.

The multicast communications model may be used to send messages from a computing device to multiple other computing devices simultaneously. This communications model includes a forwarding computing device that receives messages from sending computing devices and forwards the messages to all connected recipient computing devices. Thus, there is a one-to-many association between the forwarding computing device and the multiple recipient computing devices. Because the forwarding computing device receives messages from and sends messages to the recipient computing devices, the multicast communications model may be unable to service large numbers of users simultaneously for reasons similar to those indicated above for the unicast communications model. Specifically, the forwarding computing device may have insufficient processing power or other computing resources to keep up with large a number of messages.

The broadcast communications model may also be used to send information from a broadcasting computing device to recipient computing devices simultaneously. In the broadcast communications model, the broadcasting computing device may not even need to be aware of recipient computing devices. In fact, messages sent by a sending computing device using the broadcast communications model may not even contain destination addresses of recipient computing devices, because the sending computing device either is not aware of recipient computing devices, or is not concerned with which computing devices will receive and process its messages. To broadcast a message, the broadcasting computing device may merely send messages on a network to which the broadcasting computing device is connected without regard as to whether the messages are ultimately received. Other computing devices connected to the network may choose to process or ignore the messages sent from the broadcasting computing device. As an example, if computing device A broadcasts a message in a network to which it is connected, computing device B, which is also connected to the network, may choose to process the message. In contrast, computing device C, which is connected to the same network, may choose to ignore the message broadcast by computing device A. In the broadcast communications model, messages sent from a computing device may not traverse all devices connected to the network. As examples, proxy servers, network addressed translators, routers, gateways, and other devices that route network traffic or interconnect networks may not process messages that do not contain a destination address. As a result, messages sent by the broadcasting computing device may not reach all intended recipients.

The flooding communications model may be used to send information from a sending computing device to every other computing device known to the sending computing device. Each such connected computing device may use a unicast communications model to exchange messages with the other. A problem with the flooding model is that the same information may arrive at a computing device from multiple devices, and the same information may travel through the system multiple times, or even infinitely, unless precautions are taken. As an example, if computing device A forwards messages to computing devices B and C, computing device B forwards messages to computing devices C and A, and computing device C forwards messages to computing devices A and B, then a message sent from computing device A would reach computing device B twice: once from computing device A directly, and again from computing device C, which forwards messages received from computing device A. This is an inefficient use of network resources.

The communications models presented above typically do not have a unified architecture. A unified architecture is one in which a computing device's role is pre-selected to be a client or server. Computing devices using non-unified architectures generally cannot dynamically change their roles to efficiently route messages.

The communications models presented above may route messages inefficiently when a large number of participants are connected, or may be unable to support large numbers of participants because of, e.g., computing resource constraints. An effective approach to efficiently using network resources to manipulate and route multimedia information for meaningful presentation to users of disparate computing devices would thus have significant utility.

SUMMARY

A system for efficient routing of real-time multimedia information is provided. The system efficiently routes messages containing real-time multimedia information by configuring and using multi-control unit ("MCU") connectors, which are special-purpose components of computing systems optimized to route messages, such as messages containing multimedia information. A computing device may use multiple MCU connectors to dynamically create connections with resources of the computing device (e.g., cameras, microphones, speakers, etc.) or other computing devices simultaneously. An application using an MCU connector of a computing device, such as a Voice over Internet Protocol ("VoIP"), streaming multimedia player, or any application needing to route messages, can configure a role for the MCU connector. The application can use an application program interface of an MCU connector to configure the MCU connector's role to operate as a client, server, or client-server. By designating roles, computing devices can route messages efficiently so that, for example, a single computing device does not need to handle a large number of connections simultaneously. The MCU connector may also have a mode in which it operates, such as mixer, reflector, or selector. These modes may define how a connector is to process received messages before forwarding them. By using the various modes and roles, the system can be used to combine and efficiently route multimedia information for meaningful presentation to users of disparate computing devices.

DETAILED DESCRIPTION

Figure 1:
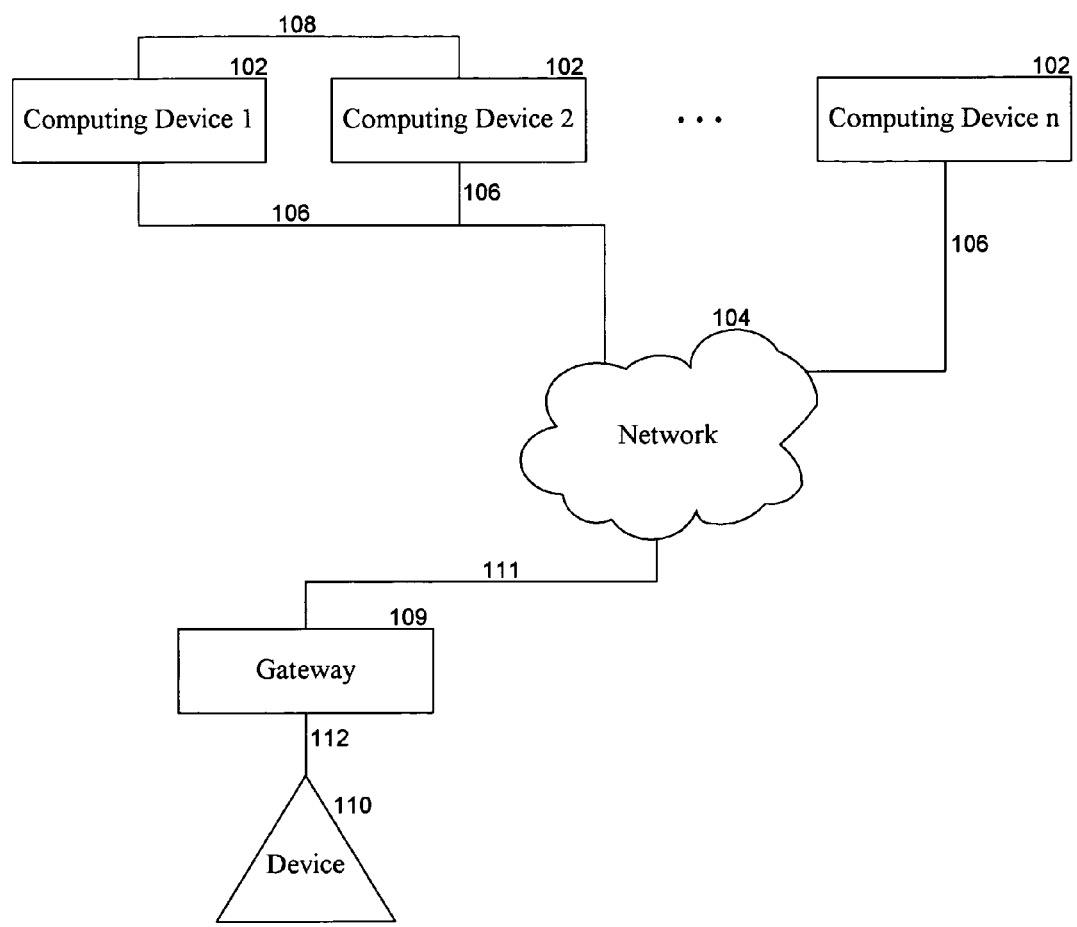
FIG. 1 is a block diagram illustrating an embodiment of a system for efficient routing of real-time multimedia information.

In an embodiment, a system for efficient routing of real-time multimedia information is provided. The system efficiently routes messages containing real-time multimedia information by configuring and using multi-control unit ("MCU") connectors, which are special-purpose components of computing systems optimized to route messages, such as messages containing multimedia information. A computing device may use multiple MCU connectors to create connections with resources of the computing device (e.g., cameras, microphones, speakers, etc.) or other computing devices simultaneously. An MCU connector thus enables dynamic creation of logical connections in a manner resembling that of a physical crossbar. An application using an MCU connector of a computing device, such as a Voice over Internet Protocol ("VoIP"), streaming multimedia player, or any application needing to route messages, can configure a role for the MCU connector. The role of a MCU connector may define how the MCU connector is to operate. The application can use an application program interface ("API") of an MCU connector to configure the MCU connector's role as client, server, or client-server.

An application that creates or consumes messages may configure an MCU connector's role as client. Examples of applications that create or consume messages include, e.g., MICROSOFT MESSENGER, VoIP clients, and SIP clients generally. Some applications traditionally referred to as server applications may also configure an MCU connector to operate as a client when these applications desire to create or consume messages. As an example, gateways or proxy servers may configure an MCU connector to operate as a client because they consume messages from clients and create messages for sending to servers. Gateways generally bridge or translate information from one network to another, and are thus clients for one network and servers for another. Similarly, proxy servers generally act as a client for servers and server for clients. An MCU connector operating as a client may route all of its active inputs to each of its active outputs. An active input or output is one which is connected to another connector or computing device that is creating or consuming messages. As an example, a VoIP application may play back all arriving messages received on an active input on a speaker or a headset, and may send messages containing all audio inputs, such as from a microphone or audio file, to active outputs. Another example is a gateway that translates audio between a traditional telephone system and a VoIP system. The gateway may configure an MCU connector to operate as a client because it receives audio information from the telephone system or the VoIP system, and translates it into messages (or signals) acceptable by the other system. When an MCU connector is operating as a client, it may not perform any processing relating to the content of incoming messages.

Applications may configure an MCU connector's role as a server when message contents are processed or routed to other computing devices. As an example, when the application receives audio and video information from multiple participants in a conversation, the application may need to process the received audio, select an appropriate video source, and route the received audio and video to other computing devices. Processing the audio may include, e.g., "mixing" the audio so that audio from simultaneously talking participants is heard as simultaneous speech rather than sequential speech. Thus, applications executing on two computing devices may send their audio and visual information from two participants of a three-way conversation to a third computing device whose MCU connector is operating as a server. This MCU connector may mix the audio information before it plays the mixed audio to a third participant using the computing device associated with the MCU connector or forwards the audio information to another computing device, and may also select the video information relating to the last talker. As an example, if A, B, and C are engaged in a conversation in which A speaks first followed by B and C simultaneously, A would hear mixed audio from B and C, B would hear A's audio followed by C's audio, and C would hear A's audio followed by B's audio. Additionally, A would receive either B's or C's video information (or both), B would receive A's video information followed by C's, and C would receive A's video information followed by B's. Thus, when operating as a server, an MCU connector processes or selects multimedia information when routing messages.

Applications may configure an MCU connector's role as client-server when the application needs to both create or consume messages as well as route messages to other MCU connectors operating as clients. As an example, a VoIP application that invites a VoIP-based telephone to a conversation may operate as a client for the VoIP application and as a server for the VoIP-based telephone. Thus, an MCU connector operating as a client-server performs both client- and server-like operations.

An MCU connector may additionally operate in mixer, reflector, or selector modes. In mixer mode, the MCU connector may process audio information by mixing audio and selecting video, as described above in relation to the example of a MCU connector operating as a server. Video can be mixed by, e.g., placing images beside one another, in a small window over a larger window, tiling images, or superimposing images. In reflector mode, the MCU connector may forward received messages directly without mixing the audio. As an example, if A, B, and C are engaged in a conversation in which A speaks first followed by B and C simultaneously, A would receive B's audio and C's audio in whichever order the MCU connector forwarded the messages. In selector mode, the MCU connector may select one of the inputs and ignore the others. As an example, if A, B, and C are engaged in a conversation in which A speaks first followed by B and C simultaneously, A may receive only messages from B or C, but not the other. The selector mode may be more commonly employed with video.

In an embodiment, the selector may be configured to select audio or video information based on characteristics of the information. As an example, the audio and video of a participant speaking the loudest may be selected.

In an embodiment, mixing and selection may be performed jointly. As an example, in a large conversation or electronic classroom context, an MCU connector may be configured to mix the audio and video information of a presenter (e.g., teacher) and a participant asking a question (e.g., student).

By using MCU connector components to route messages, applications are able to dynamically select routes for multimedia messages by configuring computing devices to be clients, servers, or both, so that a single computing device or pre-selected computing devices are not required to route the messages. Thus, multimedia messages can be efficiently routed because multiple computing devices can be used as clients, servers, or both, and their roles and modes can be dynamically selected during the course of a conversation or other application session.

Turning now to the figures, FIG. 1 is a block diagram illustrating an embodiment of a system for efficiently routing real-time multimedia information. The system comprises multiple computing devices 102, and a network 104. The network 104 may be, e.g., an intranet, the Internet, or any other form of network. The computing devices may be connected to the network. The computing devices may also be interconnected independently, such as via a private connection 108. The system may also comprise a gateway 109 and a device 110 connected to the gateway via connection 112. The gateway may be, e.g., a device that bridges or translates messages or signals between a VoIP phone device and a computing device connected to a network. The gateway may be connected to the network via connection 111. The various network connections of the system may be wired, or wireless, or a combination. The various network connections may use a variety of protocols such as Transport Control Protocol/Internet Protocol ("TCP/IP") or User Datagram Protocol ("UDP").

Figure 2:
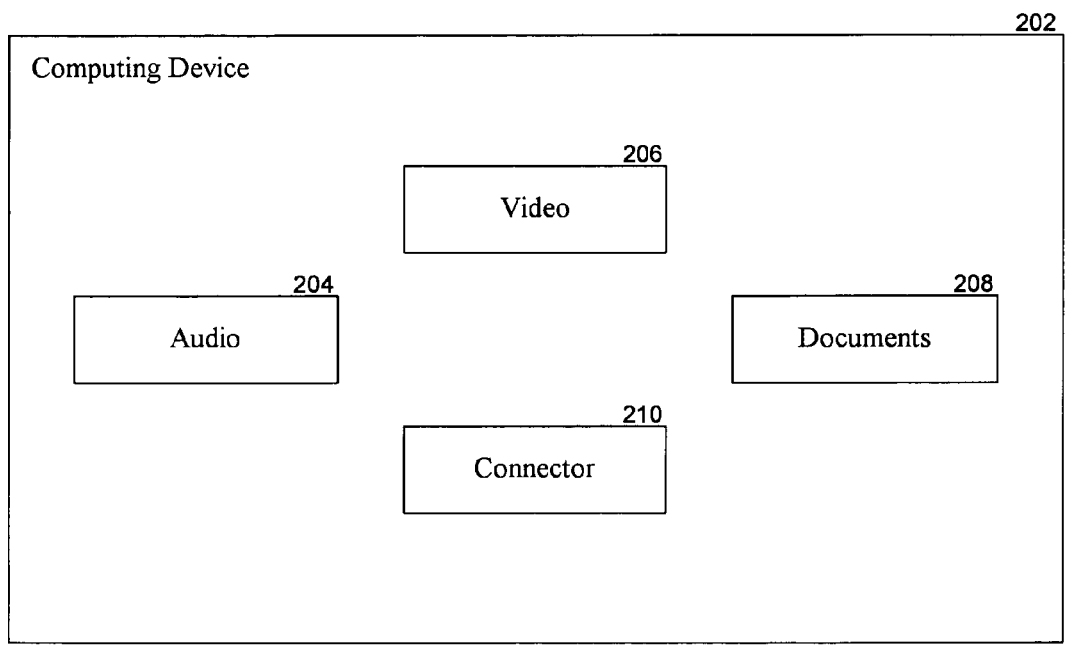
FIG. 2 is a block diagram illustrating an embodiment of a computing device of FIG. 1.

FIG. 2 is a block diagram illustrating an embodiment of a computing device of FIG. 1. The computing device 202 comprises an audio component 204, video component 206, documents component 208, and MCU connector ("connector") component 210. The audio component may process audio information. As an example, the audio component may receive audio signals from a microphone or play audio signals on a speaker. The audio component may also mix audio signals, as directed by the connector component. As an example, the audio component may mix an audio signal received from a microphone with audio information contained in messages received from other computing devices to which the connector is connected.

The video component may process video signals. As an example, the video component may receive video from a video camera or may play video on a screen. The video component may also perform other features such as mixing video by overlaying or inlaying video images from multiple sources.

The documents component may process other forms of electronic information. As an example, the documents component may register a participant's manipulations of a word processing document and forward those manipulations through the network to other participants. Similarly, the documents component may receive manipulations other users perform to documents and display those manipulations on a screen connected to the computing device.

The connector component creates and configures various forms of connections, such as audio and video connections. The computing device may comprise multiple connector components (not shown). The connector component may use the other components to, e.g., mix audio or video information. The connector component is further described below in relation to FIG. 3.

Figure 3:
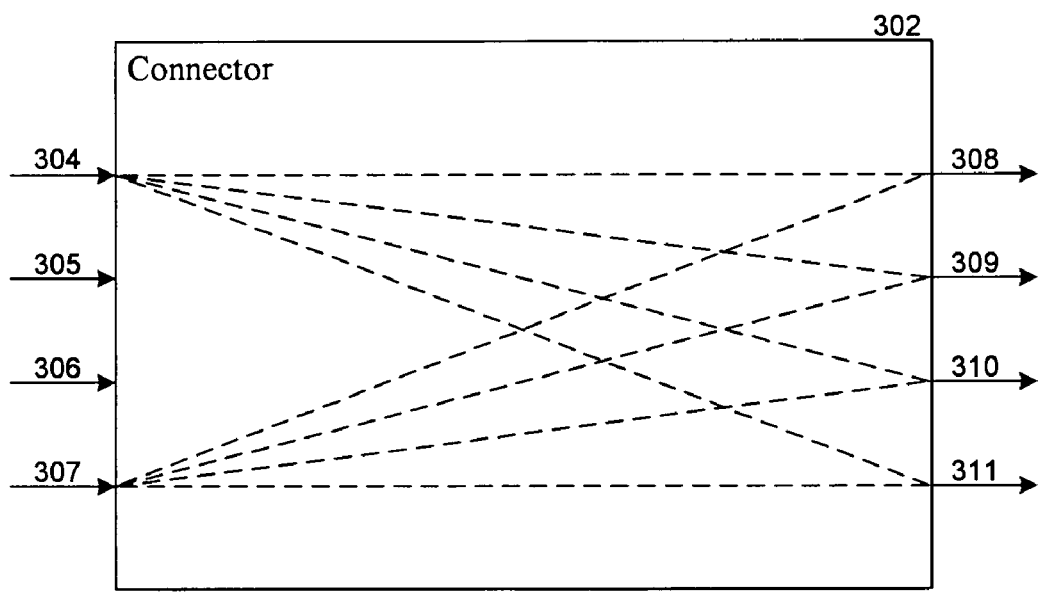
FIG. 3 is a block diagram illustrating an embodiment of a connector of FIG. 2.

FIG. 3 is a block diagram illustrating an embodiment of a connector component of FIG. 2. The connector component comprises multiple inputs, such as inputs 304, 305, 306, and 307. The connector also comprises multiple outputs, such as outputs 308, 309, 310, and 311. The inputs and outputs are used to connect to other devices, including computing devices, to receive or send information. The connector component may be configured in multiple ways. As an example, the input 304 may be configured to forward all incoming signals to outputs 308, 309, 310, and 311. Input 307 may be configured in a similar manner. Input 305 may be configured to not forward any inputs. Input 306 may be configured dynamically, such as during processing of information, to forward inputs in an appropriate manner (not shown). As an example, input 306 may be configured to forward received video information to devices connected to the connector component's outputs only when the source of the received video information is also the present talker.

The connector component has an API that exposes multiple methods and properties, and enables an application to register itself to receive event notifications that the connector component generates. A set of "platform" functions (e.g., methods, properties, and events) relate to using a media stack of the device. The media stack provides input and output of audio and video. As an example, the stack may provide input from microphones or cameras, and output to speakers and video screens. A server and client, and indeed any computing device used by participants, may use similar and compatible media stacks. The platform functions may also enable an application to query the connector to determine what inputs or outputs are available on the device. By using the platform functions, an application can, e.g., receive audio and video input from a participant using the device, and play audio and video received from other participants on the device. Because the connector has an API for these features, application developers do not need to learn about how to control these input or output devices manufactured by multiple vendors.

Applications can use the connector component's API to add or remove connections dynamically. As an example, an application program may add connections when additional participants join a conversation or remove connections as participants leave a conversation.

The connector component's API also has functions relating to message routing and mode selection. Routes can be configured by an application for audio and video either based on a role (e.g., client, server, or client-server) specified for the connector or based on a specified route. The API can be used to select the connector component's mode as, e.g., mixer, reflector, or selector modes.

Figure 4:
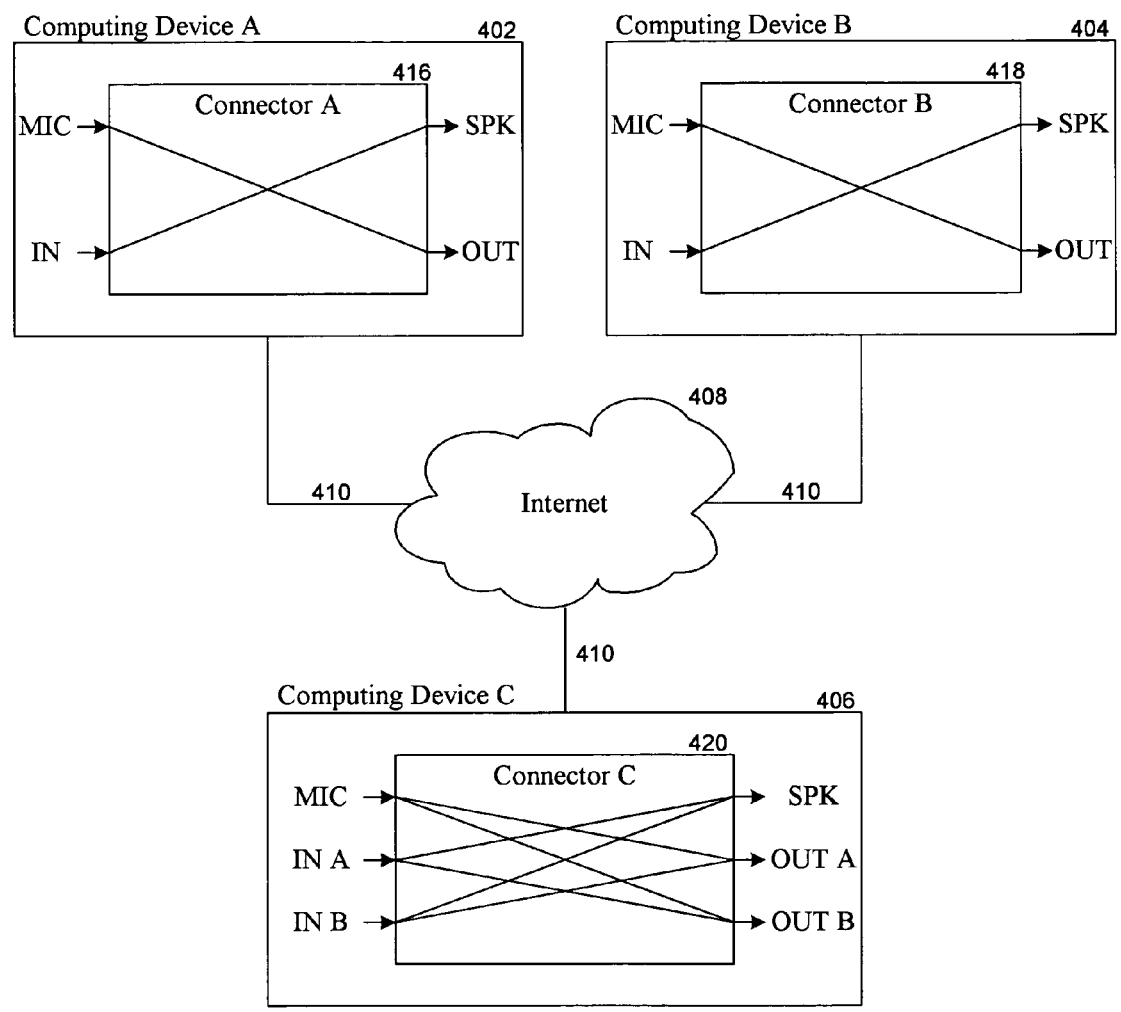
FIG. 4 is a block diagram illustrating an embodiment of a system using multiple connectors.

FIG. 4 is a block diagram illustrating an embodiment of a system using multiple connectors. The system comprises three computing devices: computing device A 402, computing device B 404, and computing device C 406. The computing devices may be connected to a network, such as the Internet 408, via a communications link 410. Each computing device comprises one or more connectors. In the illustrated embodiment, computing devices A, B and C have connectors 416, 418, 420, respectively. In the illustrated embodiment, computing devices A and B are configured as clients, and computing device C is configured as a server. The server's connector is configured to operate in mixer mode. Connectors 416 and 418, which are operating as clients, each are illustrated as having two inputs and outputs. An input to each of these two connectors is from a microphone coupled to the computing device of the connector. Other sources of audio input are also possible, such as from CD players, juke boxes, MP3 players, and, indeed, any audio source. A second input to each of these two connectors is from other computing devices, e.g., received through a network ("network input"). An output of each of these connectors is coupled to a speaker of the computing device of the connector. Any audio output can be used instead of a speaker including, e.g., receivers, amplifies, headphones, audio recorders, etc. A second output of each of these connectors sends output from the connector to other computer devices to which the computing device of the connector is connected ("network output"). The connector of computing device C, which is configured as a server operating in mixer mode, has three inputs and three outputs. The three inputs of this connector receive information from a microphone, computing device A ("network input A"), and computing device B ("network input B"), respectively. The three outputs of this connector send information to a speaker, computing device A ("network output A"), and computing device B ("network output B"), respectively. The illustrated connector of computing device C may also have other inputs and outputs (not shown). The computing devices may have additional connectors (also not shown).

The illustrated configuration may be used in a three-way conversation between participants using each of the three illustrated computing devices. Suppose participants A, B and C are together participating in an online conversation using computing devices A, B, and C respectively. Connector A may route spoken information it receives from participant A to its network output, and information it receives from other computing devices via its network input to its speaker. Similarly, connector B may route information it receives from participant B via its microphone input to its network output, and may route information it receives from other computing devices via its network input to its speaker output. Connector C, which is operating as a server in mixer mode, mixes information received from its microphone input and each of its two network inputs before forwarding the mixed information to a network output. As an example, the connector mixes information it receives from participant C via its microphone input and participant A via its network input A, and forwards the mixed information to the computing device of participant B via its network output B. Similarly, the connector mixes information it receives from participant C and information it receives from participant B via its network input B, and forwards the mixed information to participant A via its network output A. Connector C also mixes information it receives from participants A and B via its network inputs A and B and forwards the mixed information to its speaker output. In so doing, each of the three participants receives mixed audio information from the other two participants.

The system may also have similarly configured video connectors (not shown). In such a case, a video connector of computing device C may be configured in selector mode, and may select video information of the talking participant for each of the other two participants, and may select video information of the last talker for the currently talking participant. The video connectors may have a camera input rather than (or in addition to) a microphone input, and may further have a monitor output rather than a speaker output. The system can also be configured in other video modes, such as mixer mode.

By using video and audio connectors that are appropriately configured, the system is able to adapt to needs of participants to route real-time multimedia information efficiently. As an example, if participant A, who is using computing device A, is in a conversation with participant C, who is using computing device C, connectors of computing devices A and C may operate in client mode. When participant C invites participant B to the conversation, the connector of computing device C may dynamically change its role and mode to operate as a server in mixer mode. Thus, computing devices A, B, or C may not need to be connected to a fourth computing device that is capable of routing information for all three users.

Figure 5:
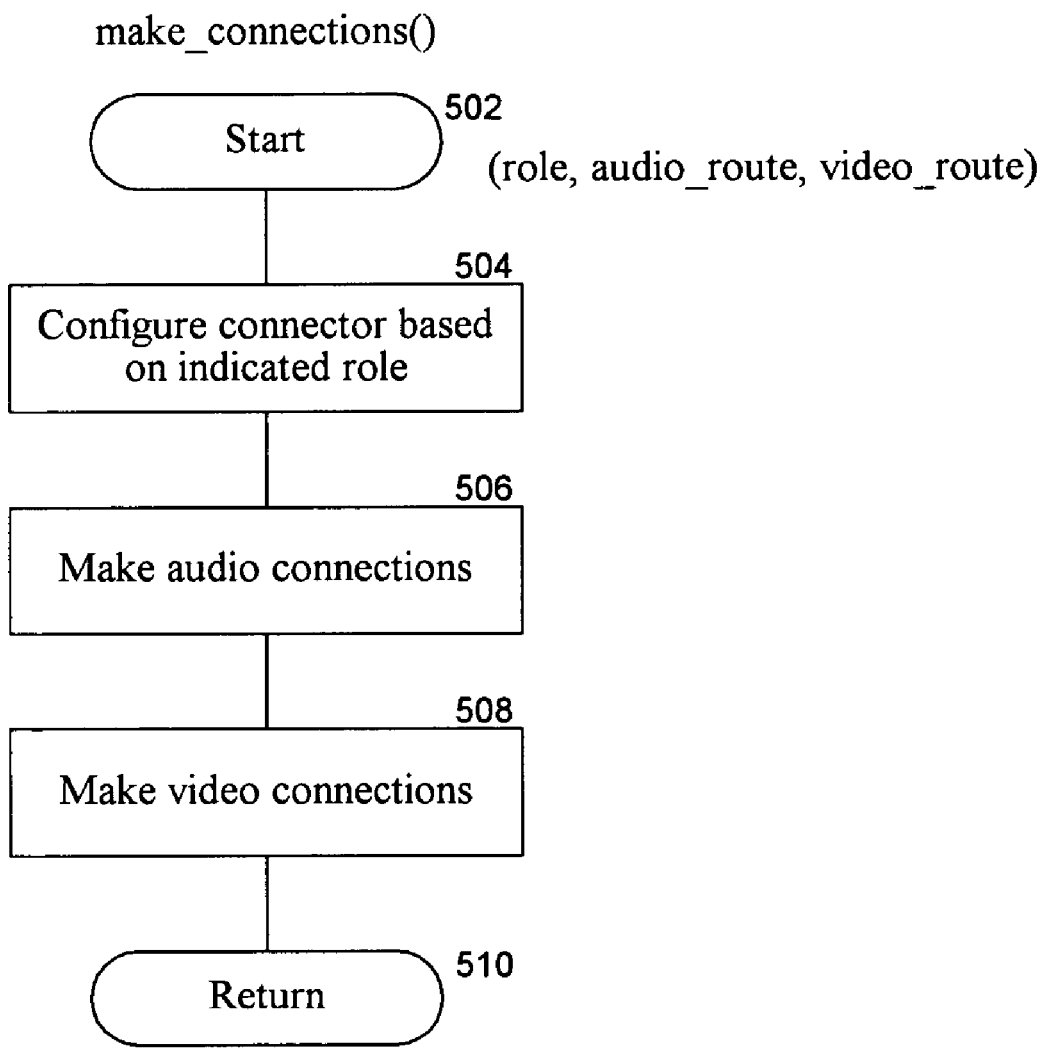
FIG. 5 is a flow diagram illustrating an embodiment of a make_connections.

FIG. 5 is a flow diagram illustrating an embodiment of a make_connections routine. The routine is performed by a connector component and configures routes. The routes of a connector indicate which inputs are connected to which outputs, thus forming connections between inputs and outputs of the connector. The routine begins at block 502 where it receives as parameters indications of a role, audio routes, and video routes. The routes may be configured based on the role and routes specified in the parameters of the routine. At block 504, the routine configures the connector based on the indicated role. As an example, if the indicated role is client, the routine may configure the connector to forward all received inputs to all outputs. At block 506, the routine makes all audio connections, as indicated in the received parameters. At block 508, the routine makes all video connections as indicated in the received parameters. The routine may need to make the audio and video connections when, e.g., the routes are specified in the parameters of the routine. Applications using connectors may specify audio and video routes when specialized handling of multimedia information is desirable. As an example, a teleconference application having multiple participants may want to route information differently than a VoIP application having a fewer number of participants. As a further example, these applications may want to enable videoconferencing for some participants but not others (e.g., based on capabilities of the participants' computing devices). An audio route may specify that the microphone associated with an attached videocamera is to be used (rather than a microphone associated with the computing device directly) and is to be connected to a network output of the connector. A video route may specify that the videocamera's output is also to be connected to the connector's output. At block 510, the routine returns to its caller.

Figure 6:
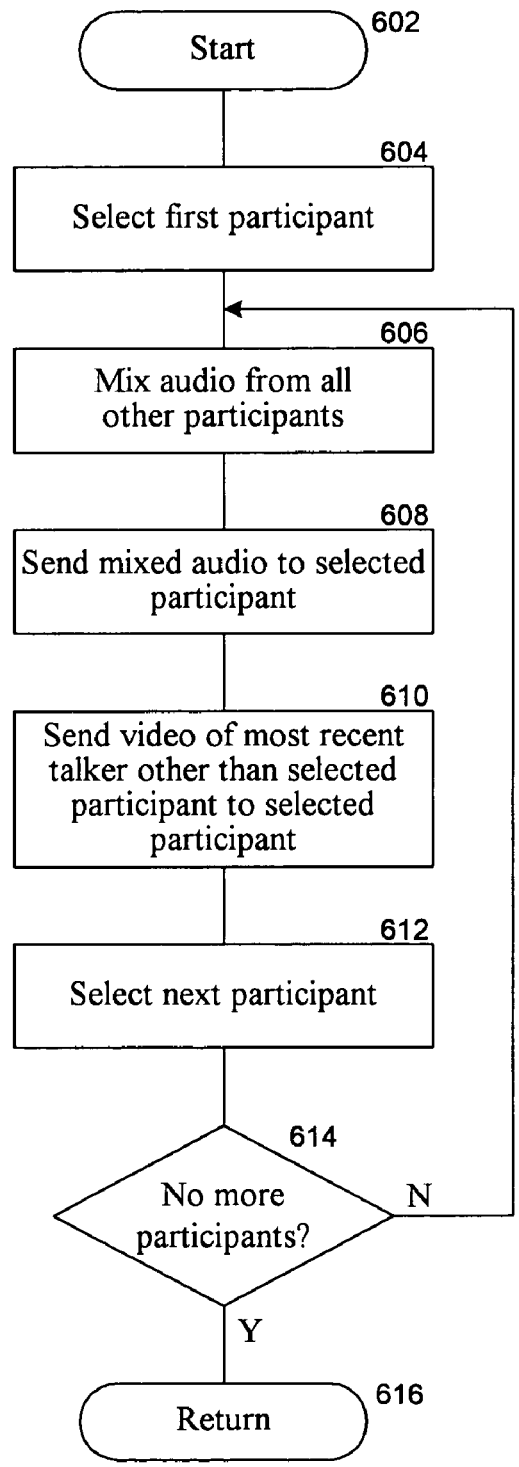
FIG. 6 is a flow diagram illustrating an embodiment of a route routine performed by a connector operating in mixer mode.

FIG. 6 is a flow diagram illustrating an embodiment of a route routine performed by a connector operating in audio mixer and video selector modes. The routine determines how to route audio and video messages when the connector is operating in audio mixer mode and video selector mode. The routine begins at block 602. At block 604, the routine selects the first participant in a conversation. At block 606, the routine mixes all audio inputs from all participants other than the selected participant. As an example, if A is in a conversation with B and C, and A is the selected participant, the routine mixes audio inputs from B and C. A's audio would not need to be mixed because A would be aware of A's audio information. Furthermore, if A's audio is mixed and returned to A, network delays may cause A to receive audio information A sent a short time after sending it, which could lead to confusion on the part of A. At block 608, the routine sends the audio mixed at block 506 to the selected participant. Continuing the example presented above, the routine sends the mixed audio of B and C to A.

At block 610, the routine may send a video signal of the most recently talking participant, other than the selected participant, to the selected participant. As an example, if A is in a conversation with B and C, B was the last talker and A is the present talker, A would receive no audio signals (because A is talking) and B's video signal (because B was the last talker). In contrast, B and C would receive A's audio and video signals because A is the present talker. In an embodiment, at block 610, video information of participants may be mixed. As an example, video information of all talkers may be tiled. Tiling video information includes positioning video information from participants in adjacent windows.

At block 612, the routine selects the next participant who is not the talker. At block 614, the routine determines whether there are no more participants. If that is the case, the routine continues to block 616. Otherwise, the routine continues at block 606. At block 616, the routine returns to its caller.

Figure 7:
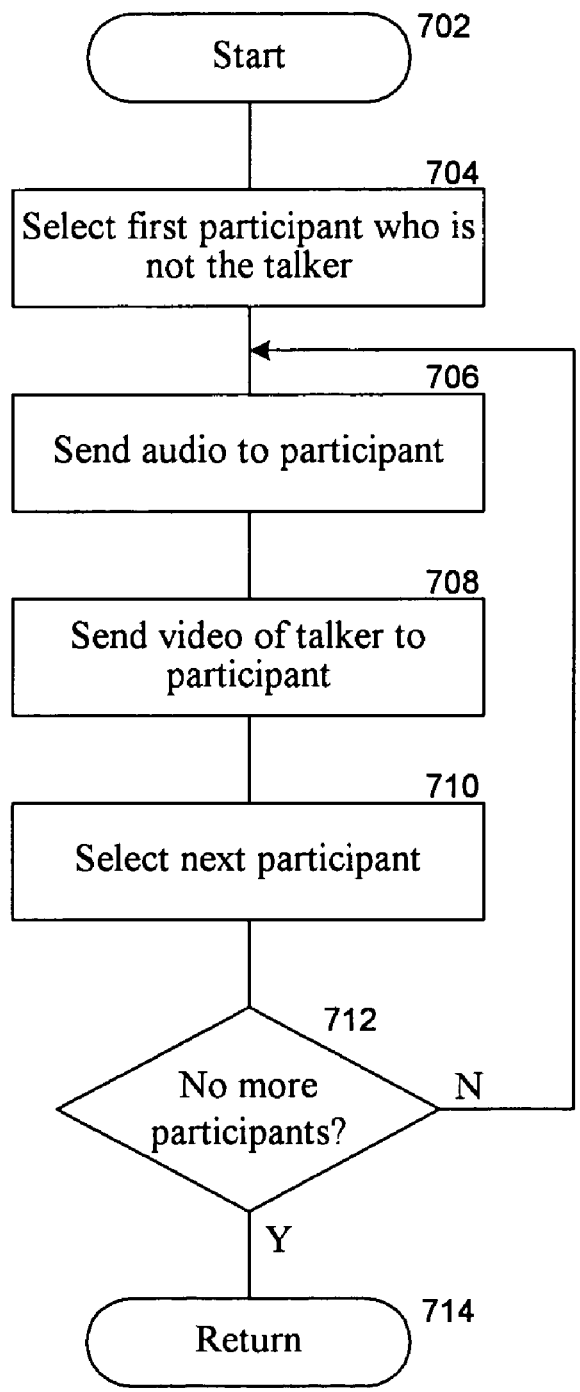
FIG. 7 is a flow diagram illustrating an embodiment of a route routine performed by a connector operating in reflector mode.

FIG. 7 is a flow diagram illustrating an embodiment of a route routine performed by a connector operating in reflector mode. The routine determines how to route audio and video messages when the connector is operating in reflector mode. The routine begins at block 702. At block 704, the routine selects the first participant of a conversation who is not the presently talking participant. At block 706, the routine sends the audio messages of the talker to the selected participant. At block 708, the routine sends the video messages of the talker to the selected participant. If there are multiple talkers, audio and video from the talkers may be sent sequentially. As an example, if participants A, B, and C are in a conversation in which B and C are talking simultaneously, A may receive B's audio and video before C's. At block 710, the routine selects the next participant who is not the talker. At block 712, the routine determines whether there are no more participants to be selected. If that is the case, the routine continues at block 714. Otherwise, the routine continues at block 706. At block 714, the routine returns to its caller.

Figure 8:
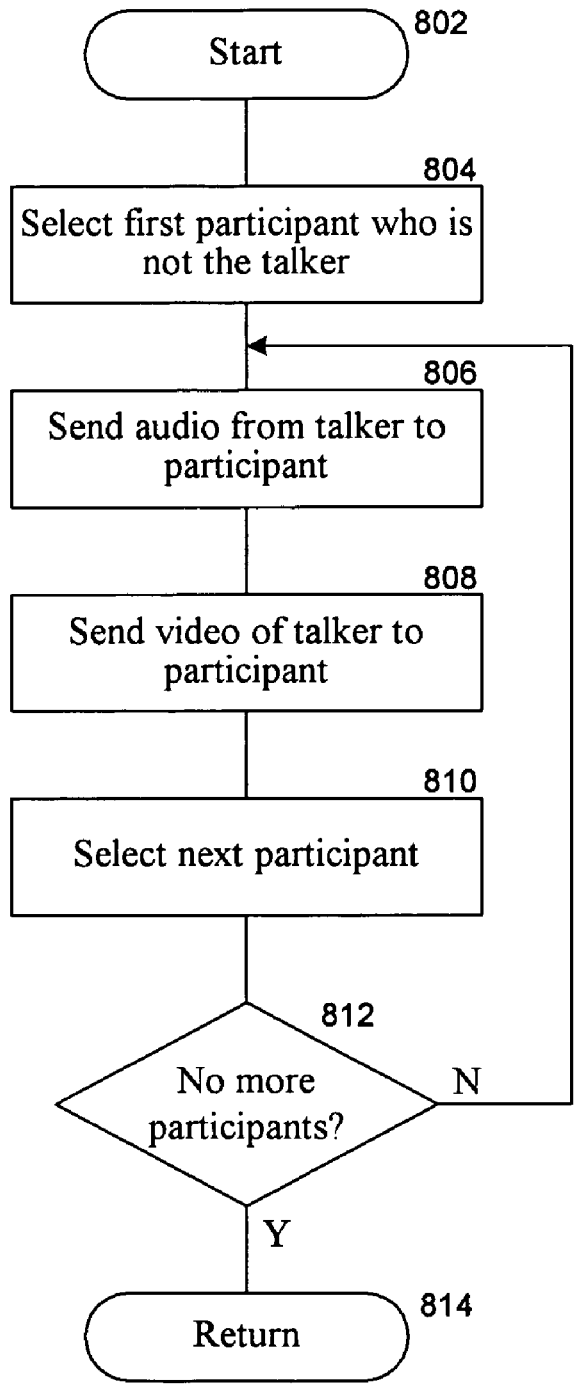
FIG. 8 is a flow diagram illustrating an embodiment of a route routine performed by a connector operating in selector mode.

FIG. 8 is a flow diagram illustrating an embodiment of a route routine performed by a connector operating in selector mode. The routine determines how to route audio and video messages when the connector is operating in selector mode. The routine begins at block 802. At block 804, the routine selects the first participant who is not the presently talking participant. At block 806, the routine sends the audio messages from the talker to the selected participant. At block 808, the routine sends the video messages from the talker to the selected participant. In selector mode, only audio or video information from one participant may be sent and received. As an example, if participants A, B, and C are in a conversation in which B and C are talking simultaneously, A may receive only B's audio and video information. At block 810, the routine selects the next participant who is not the talker. At block 812, the routine determines whether there are no more participants. If that is the case, the routine continues at block 814. Otherwise, the routine continues at block 806. At block 814, the routine returns to its caller.

In an embodiment, selector mode may be used for selecting video information. In such a case, while video information may be selected, audio information may be mixed. Thus, at block 806, audio from all participants may be mixed and forwarded.

Participants in conversations may use various forms of computing devices. As examples, a participant in a videoconference may use a personal computer, a second participant may use a cellular telephone, and a third participant may use some other form of computing device that can receive and send audio and video information. The participant using the personal computer may wish to receive and send audio and video information during the conversation. In contrast, the participant using the cellular telephone may only wish to receive audio information. Finally, the participant using a computing device capable of sending and receiving audio and video information (e.g., a videophone) may also wish to receive and send audio and video information.

The computing device on which the system for efficient routing of real-time multimedia information is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the system for efficient routing of real-time multimedia information may be implemented. The operating environment is only one example of a suitable operating environment and is not intended to suggest any limitation as to the scope of use or functionality of the system. Other well-known computing systems, environments, and configurations that may be suitable for use include personal computers, server computers, hand-held or laptop devices including "smart" cellular telephones, multiprocessor systems, microprocessor-based systems, programmable consumer electronics, network PCs, minicomputers, mainframe computers, distributed computing environments that include any of the above systems or devices, and the like.

The system for efficient routing of real-time multimedia information may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A computer-readable storage device storing instructions that implement an application program interface relating to routing real-time multimedia information, the instructions comprising:
    a software component stored on a memory or storage device that provides the application program interface and is connectable to other software components for making connections, the connections indicating routes between inputs and outputs, the application program interface enabling other software components to command and control the software component;
    a component for setting a mode to at least reflector;
    a component for receiving data on at least two inputs, wherein each input is received from a different computing device;
    a component for processing the received data based on the set mode, wherein (a) when the mode is set to mixer, the processing includes mixing audio, and selecting or mixing video, (b) when the mode is set to reflector, the processing includes forwarding the received data to the indicated output without performing any mixing, (c) when the mode is set to selector, the processing includes forwarding data received on an input and ignoring data received on other inputs;
    a component for setting a role as one of a client, server, or client-server, wherein if the role is set to client-server, messages are both consumed and routed to at least one client; and
    a component for forwarding the processed data to an output indicated for the input on which the data was received.

2. The computer-readable storage device of claim 1 wherein when the mode is set to mixer, the processing includes mixing multiple inputs for forwarding to the indicated output.

3. The computer-readable storage device of claim 2 wherein multiple inputs are indicated for the output.

4. The computer-readable storage device of claim 2 wherein when the received data is audio, the mixing includes combining audio information.

5. The computer-readable storage device of claim 4 wherein the combining includes analyzing an indication of a time at which the data was generated.

6. The computer-readable storage device of claim 2 wherein when the received data is video, the mixing includes combining video information.

7. The computer-readable storage device of claim 6 wherein the combining includes placing video information received in an input as data inside a window that appears inside video information received in another input as data.

8. The computer-readable storage device of claim 6 wherein the combining includes placing video information received as data in an input adjacent to video information received as data in another input.

9. The computer-readable storage device of claim 1 wherein when the mode is set to reflector, the processing includes forwarding the received data to the indicated output without performing any mixing in data from at least one input.

10. The computer-readable storage device of claim 1 wherein when the mode is set to selector, the processing includes forwarding data received on only one input and ignoring data received on other inputs.

11. A method performed by a computer system having a central processing unit for routing real-time multimedia information, the computer system having a connector implemented in software that is connectable to software components, comprising:
    providing an application program interface configured to receive command and control instructions;
    receiving by the application program interface routing information, the routing information specifying an input and an output;
    receiving an indication of a mode as at least reflector;
    configuring by the central processing unit the connector based on the routing information and the mode;
    setting a role as one of a client, server, or client-server, wherein if the role is set to client-server, messages are both consumed and routed to at least one client; and
    forwarding data received on an input of the connector to an output of the connector based on the configuration, wherein (a) when the mode is set to mixer, mixing audio, and selecting or mixing video before forwarding the received data, (b) when the mode is set to reflector, forwarding the received data to the specified output without performing any mixing, and (c) when the mode is set to selector, forwarding data received on one of multiple inputs and ignoring data received on other inputs.

12. The method of claim 11 including processing the received data based on the indicated mode before forwarding the received data.

13. The method of claim 12 wherein when the mode is mixer, the processing includes mixing the received data.

14. The method of claim 13 including mixing audio information.

15. The method of claim 14 wherein when data containing audio information of multiple simultaneously talking participants is received, data forwarded to a talker's computing device includes audio information of all participants except the talker.

16. The method of claim 14 wherein when data containing audio information of multiple simultaneously talking participants is received, data forwarded to a participant's computing device includes audio information of all talkers.

17. The method of claim 16 wherein the participant is not talking.

18. The method of claim 13 including mixing video information.

19. The method of claim 18 wherein video information forwarded to a talker's computing device includes video information received from a previous talker's computing device.

20. The method of claim 11 including receiving an indication of a role.

21. The method of claim 20 wherein default routing information is configured based on the indicated role.

22. The method of claim 11 wherein data containing silence is not forwarded.

23. A system for routing real-time multimedia information, the system having a connector implemented in software that is connectable to software components, comprising:
a central processing unit and memory;
a component that provides an application program interface configured to receive command and control instructions;
a component that receives via the application program interface routing information, the routing information specifying an input and an output;
a component that receives an indicated selection of a mode as at least reflector;
a component that configures the connector based on the routing information and the mode;
a component that sets a role as one of a client, server, or client-server, wherein if the role is set to client-server, messages are both consumed and routed to at least one client;
a component that processes the received data based on the set mode, wherein (a) when the mode is set to mixer, the processing includes mixing audio, and selecting or mixing video, (b) when the mode is set to reflector, the processing includes forwarding the received data to the indicated output without performing any mixing, (c) when the mode is set to selector, the processing includes forwarding data received on an input and ignoring data received on other inputs; and
a component that forwards data received on an input of the connector to an output of the connector based on the configuration.

24. The system of claim 23 having a video connector and an audio connector.

25. The system of claim 24 wherein different indications of modes for the video connector and audio connector are received.

26. The system of claim 25 wherein the mode indicated for the audio connector is mixer and the mode indicated for the video connector is selector.

27. The system of claim 26 including mixing audio information of participants.

28. The system of claim 27 wherein data containing audio information that is forwarded to a talker's computing device includes data containing audio information of all participants other than the talker.

29. The system of claim 26 including selecting and forwarding video information of the talker for all participants other than the talker.

30. The system of claim 29 wherein a last talker's video information is selected for forwarding to the talker.

31. The system of claim 23 wherein TCP/IP protocols are employed to receive and forward data.

32. The system of claim 23 wherein a user datagram protocol is employed to receive and forward data.

\* \* \* \* \*